United States Patent
Hajati et al.

(10) Patent No.: US 10,007,344 B2
(45) Date of Patent: *Jun. 26, 2018

(54) ELECTRONIC DEVICE INCLUDING CLOSED-LOOP CONTROLLER FOR HAPTIC ACTUATOR AND RELATED METHODS

(71) Applicant: Apple Inc., Cupertino, CA (US)

(72) Inventors: Arman Hajati, Cupertino, CA (US); Parin Patel, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/096,379

(22) Filed: Apr. 12, 2016

(65) Prior Publication Data

US 2017/0090573 A1    Mar. 30, 2017

Related U.S. Application Data (60) Provisional application No. 62/234,880, filed on Sep. 30, 2015.

(51) Int. Cl.
*H04B 3/36* (2006.01)
*G06F 3/01* (2006.01)

(52) U.S. Cl.
CPC .................................. *G06F 3/016* (2013.01)

(58) Field of Classification Search
CPC ......... G06F 3/016; G06F 3/01; H04M 19/047
USPC .................... 340/407.1, 407.2; 345/156, 173
See application file for complete search history.

(56) References Cited

U.S. PATENT DOCUMENTS

| 4,897,582 | A | 1/1990 | Otten et al. |
| 5,999,168 | A | 12/1999 | Rosenberg et al. |
| 6,002,184 | A * | 12/1999 | Delson ............... H02K 23/00 |
| | | | 273/148 R |
| 8,169,402 | B2 | 5/2012 | Shahoian et al. |
| 8,287,522 | B2 | 10/2012 | Moses et al. |
| 8,378,965 | B2 | 2/2013 | Gregorio et al. |

(Continued)

FOREIGN PATENT DOCUMENTS

| WO | 2013169299 A1 | 11/2013 |
| WO | 2013169303 A1 | 11/2013 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Thomas Mullen
(74) *Attorney, Agent, or Firm* — Allen, Dyer, Doppelt + Gilchrist, P.A.

(57) ABSTRACT

An electronic device may include a haptic actuator that may include a housing and a field member movable within the housing, and a driver capable of driving the haptic actuator and sensing at least one of a drive voltage and drive current for the haptic actuator. The electronic device may also include a closed-loop controller cooperating with the driver. The closed-loop controller may be capable of determining a calibration of the haptic actuator based upon at least one of the drive voltage and drive current, storing a reference pattern of movement for the field member, and driving the haptic actuator in a closed-loop configuration based upon the calibration of the haptic actuator and reference pattern of movement of the field member.

32 Claims, 10 Drawing Sheets

(56) References Cited

U.S. PATENT DOCUMENTS

| | | | |
|---|---|---|---|
| 8,686,839 B2 | 4/2014 | Posamentier | |
| 9,520,036 B1 * | 12/2016 | Buuck | G08B 6/00 |
| 2008/0191648 A1 | 8/2008 | Ito et al. | |
| 2012/0229264 A1 | 9/2012 | Company Bosch et al. | |
| 2013/0264973 A1 | 10/2013 | Garg et al. | |
| 2014/0070957 A1 | 3/2014 | Longinotti-Buitoni et al. | |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

\* cited by examiner

ELECTRONIC DEVICE INCLUDING CLOSED-LOOP CONTROLLER FOR HAPTIC ACTUATOR AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a haptic actuator that may include a housing and a field member movable within the housing. The electronic device may also include a driver capable of driving the haptic actuator, and sensing at least one of a drive voltage and drive current for the haptic actuator, and a closed-loop controller cooperating with the driver. The closed-loop controller may be capable of determining a calibration of the haptic actuator based upon at least one of the driving voltage and driving current, storing at least one reference pattern of movement for the field member, and driving the haptic actuator in a closed-loop configuration based upon the calibration of the haptic actuator and at least one reference pattern of movement of the field member. Accordingly, the haptic actuator may be driven in a closed-loop configuration based upon the calibration of the haptic actuator and at least one reference pattern of movement of the field member so that, for example, the field member may move from an initial at-rest position to a steady state operation without contacting a mechanical limit stop.

The electronic device may also include a position sensor capable of sensing a position of the field member during movement thereof. The closed-loop controller may be capable of determining the calibration based upon the sensed position of the field member, for example. The closed-loop controller may be capable of closing the closed-loop configuration based upon the position sensor. The closed-loop controller may be capable of tracking a trajectory of the field member based upon the position sensor, for example.

The closed loop controller may be capable of determining the calibration of the haptic actuator based upon a velocity of the field member. The closed-loop controller may be capable of closing the closed-loop configuration based upon the velocity of the field member. The closed-loop controller may be capable of tracking a trajectory of the field member based upon the velocity of the field member.

The at least one reference pattern of movement may include a plurality of different reference patterns of movement, each corresponding to a desired one of a plurality of different operating modes of haptic feedback. Each of the plurality of reference patterns may have a different drive waveform associated therewith, for example.

The closed-loop controller may include a processor and a memory coupled thereto. The memory may be capable of storing the calibration of the haptic actuator and the at least one reference pattern, for example.

The driver may be capable of driving the haptic actuator at a plurality of different frequencies. The closed-loop controller may be capable of determining the calibration based upon a sensed impedance of the haptic actuator at the plurality of different frequencies, for example.

The closed-loop controller may be capable of determining the calibration of the haptic actuator over a given time period and driving the haptic actuator in the closed-loop configuration based upon the calibration of the haptic actuator over the given time period, for example. The closed-loop controller may be capable of determining the calibration of the haptic actuator based upon at least one of a resistance, inductance, capacitance, and a motor constant, for example. The position sensor may include at least one of a capacitive sensor, an optical sensor, and a magnetic sensor.

The haptic actuator may include at least one coil carried by the housing. The field member may be movable within the housing responsive to the at least one coil, and the closed-loop controller is capable of driving the haptic actuator by generating a drive waveform for the at least one coil.

The haptic actuator may include at least one permanent magnet carried by the housing. The field member may include at least one coil cooperating with the at least one permanent magnet, and the closed-loop controller may be capable of driving the haptic actuator by generating a drive waveform for the at least one coil.

Another device aspect is directed to an electronic device that may include a housing, wireless communications circuitry carried by the housing, and a haptic actuator carried by the housing. The haptic actuator may include an actuator housing and a field member movable within the actuator housing. The electronic device may also include a driver capable of driving the haptic actuator, and sensing at least one of a drive voltage and drive current for the haptic actuator. The electronic device may also include a closed-loop controller cooperating with the driver. The closed-loop controller may be capable of determining a calibration of the haptic actuator based upon at least one of the driving voltage and driving current, and storing at least one reference pattern of movement for the field member. The closed-loop controller may also be capable of driving the haptic actuator in a closed-loop configuration based upon the calibration of the haptic actuator and at least one reference pattern of movement of the field member. A device controller may be coupled to the wireless communications circuitry and the haptic actuator and may be capable of performing at least one wireless communications function and selectively operating the haptic actuator.

A method aspect is directed to a method of operating a haptic actuator that includes a housing and a field member movable within the housing. The method may include driving, using a driver, the haptic actuator, and sensing, using the driver, at least one of a drive voltage and drive current for the haptic actuator. The method may also include using a closed-loop controller cooperating with the driver to determine a calibration of the haptic actuator based upon the sensed position of the field member and at least one of the driving voltage and driving current, and store at least one reference pattern of movement for the field member. The method may also include using the closed-loop controller to drive the haptic actuator in a closed-loop configuration based upon the calibration of the haptic actuator and at least one reference pattern of movement of the field member.

BRIEF DESCRIPTION OF THE DRAWINGS

FIG. 5b is a graph of exemplary tap momentum corresponding to the drive waveform of FIG. 5a.

FIG. 6b is a graph of expected and observed displacement and velocity corresponding to the drive waveform of FIG. 6a.

FIG. 7b is a graph of expected and observed displacement and velocity corresponding to the drive waveform of FIG. 7a.

FIG. 8b is a graph of displacement and velocity corresponding to the drive waveform of FIG. 8a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to describe like elements in different embodiments.

Figure 1:
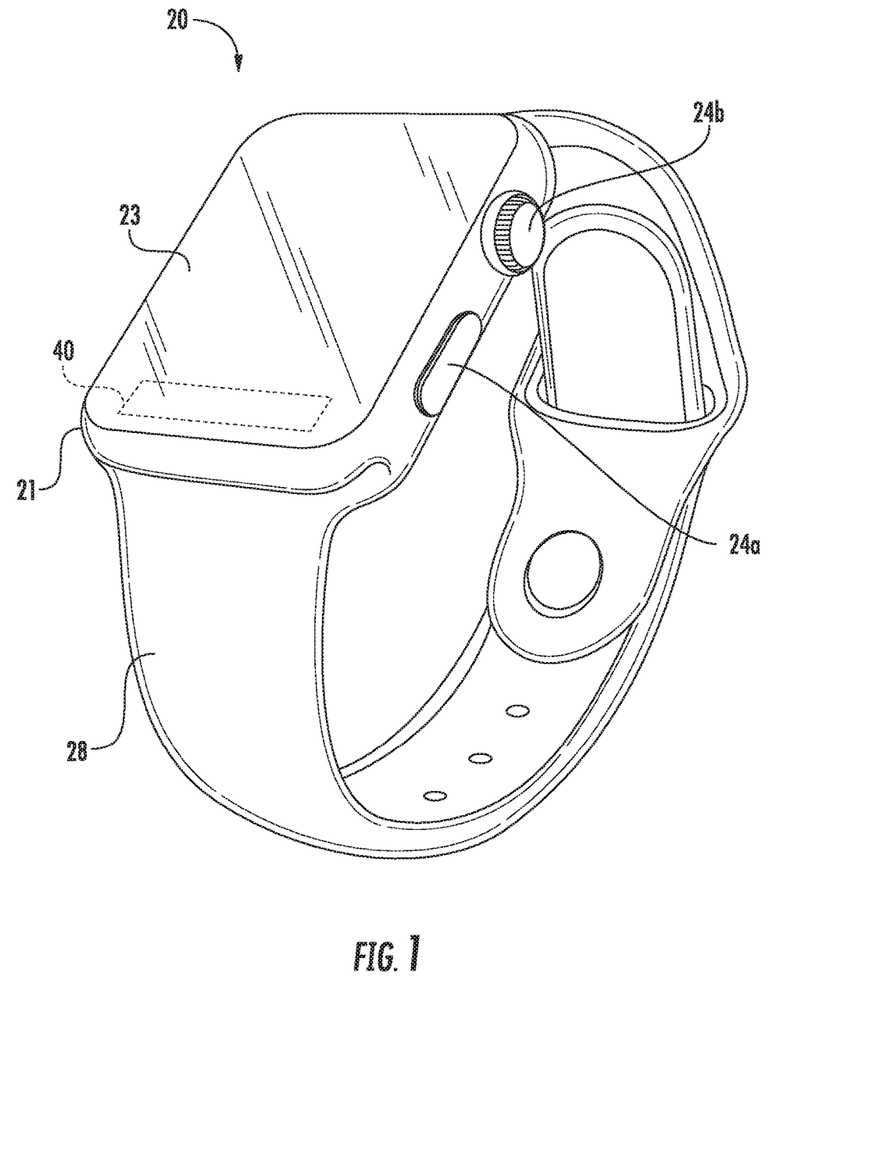
FIG. 1 is a perspective view of an electronic device including a haptic actuator according to an embodiment of the present invention.
Figure 2:
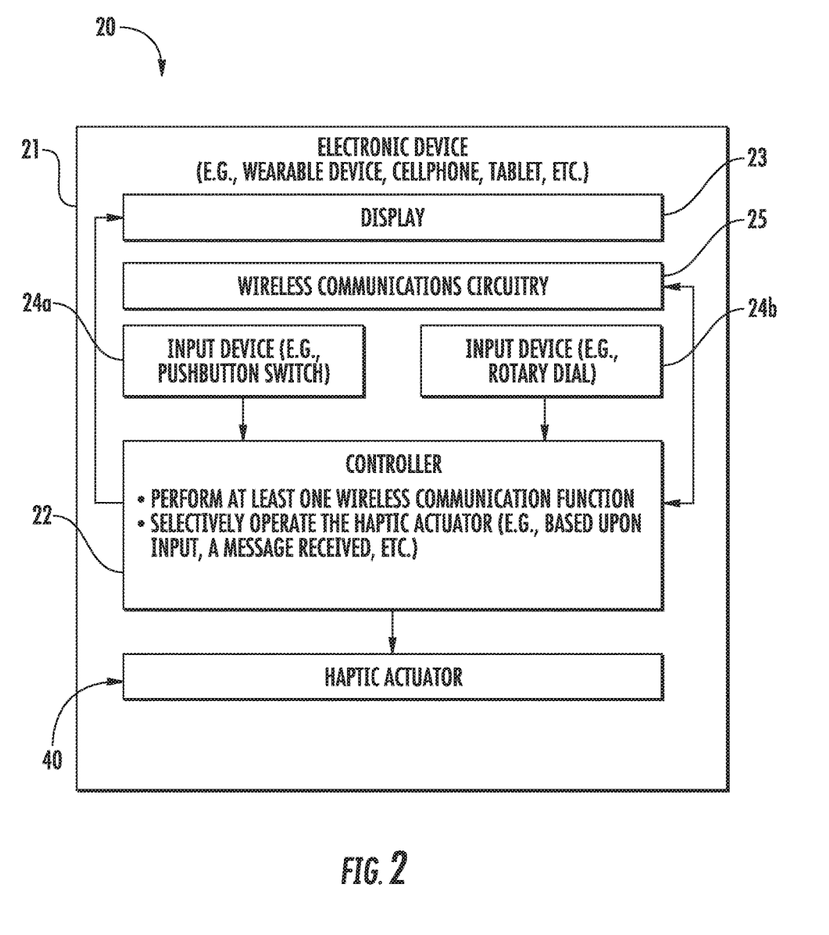
FIG. 2 is a schematic block diagram of the electronic device of FIG. 1.

Referring initially to FIGS. 1 and 2, an electronic device 20 illustratively includes a device housing 21 and a device controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the device controller 22. The wireless communications circuitry 25 cooperates with the device controller 22 to perform at least one wireless communications function, for example, for voice and/or data. In some embodiments, the electronic device 20 may not include wireless communications circuitry 25.

A display 23 is also carried by the device housing 21 and is coupled to the device controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and is coupled to the device controller 22. The pushbutton switch 24a and the rotary dial 24b cooperate with the device controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the device controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the device controller 22 applies a voltage to move a moveable body or a mass 51 between first and second positions.

While a device controller 22 is described, it should be understood that the device controller 22 may include one or more of a processor and other circuitry to perform the functions described herein. The controller 22 may also be embodied as one or more of a field programmable gate array (FPGA), microcontroller, digital signal processor (DSP), central processing unit (CPU), or application specific integrated circuit (ASIC).

Figure 3:
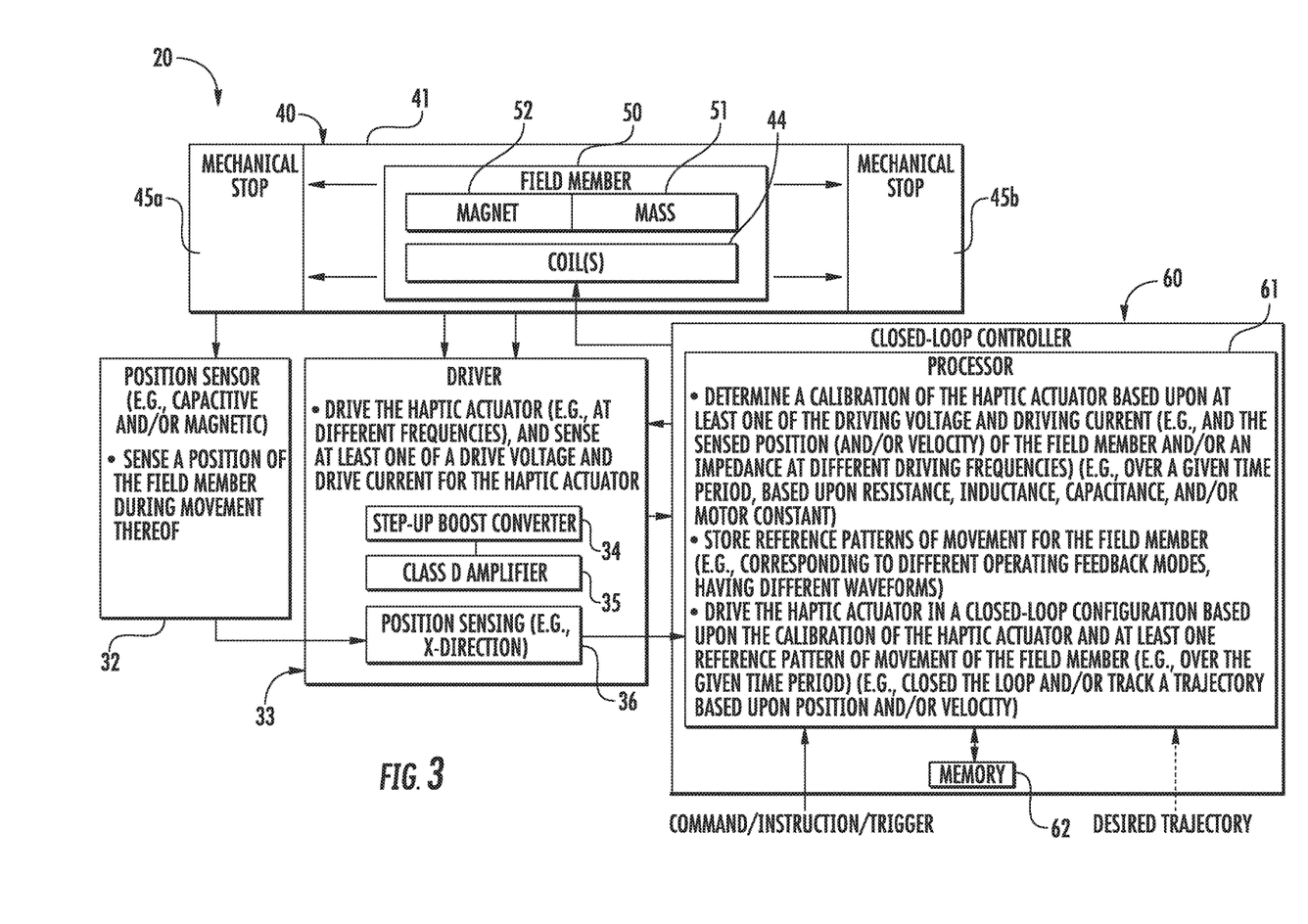
FIG. 3 is a more detailed schematic diagram of the haptic actuator of FIG. 1.

Referring now additionally to FIG. 3, the haptic actuator 40 includes an actuator housing 41 and a coil 44 carried by the housing. Of course, there may be more than one coil carried by the housing 41.

A field member 50 is movable within the housing 41 responsive to the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses 51 and may be shaped for a particular application or operation. The field member 50 may also include one or more permanent magnets 52 cooperating with the coil 44 to provide movement of the field member. The field member 50 may also include a suspension system that may include one or more springs for maintaining the field member suspended in the housing 41. The springs may include mechanical springs, such as, for example, coil springs, leaf springs, and flexures. The springs may also or additionally include magnetic springs that, through interaction with the permanent magnets and/or ferritic parts of the actuator housing 41, if any, store and amplify the energy in the form of elastic/ magnetic energy. In addition, the suspension system, for example, through shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom. The suspension system may include other and/or additional components for maintaining the suspension of the field member 50 as well as constrain movement of the field member.

The haptic actuator 40 also includes mechanical limit stops 45a, 45b between the housing 41 and the field member 50. The mechanical limit stops 45a, 45b limit the movement of the field member to a desired range and/or stop the field member from crashing or banging into the housing 41. While mechanical stops 45a, 45b are described, it will be appreciated that the mechanical stops may be part of or a portion of the housing 41.

Typically, circuitry generates a sinusoidal drive waveform that drives the field member to move from an initial at-rest position. However, as will be appreciated by those skilled in the art, in a stationary or at-rest position, the field member 50 has a static friction associated with it which may cause the field member to "get stuck" despite the application of a drive voltage. A certain amount of force or voltage is thus needed to overcome this static friction force to cause the field member 50 to move. One approach to drive the field member 50 from the at-rest position is to increase the drive voltage or amplitude of the sinusoidal drive waveform. However, once the static friction force is overcome, the field member 50 typically rapidly accelerates and crashes or bangs into the mechanical limit stops 45a, 45b.

In some applications it may be particularly desirable to not have the field member 50 hit or bang into the mechanical limit stops 45a, 45b as this may generate a corresponding "banging" noise. To reduce the amount of noise, for example, caused by the increased amplitude, the electronic device 20 may include circuitry for driving the field member 50 without contacting the mechanical limit stops 45a, 45b, as will be described in further detail below.

To drive the field member 50 without contacting the mechanical limit stops 45a, 45b, the electronic device 20 illustratively may also include a position sensor 32 that senses a position of the field member during movement thereof. The position sensor 32 may be a capacitive sensor, an optical sensor, a magnetic sensor, back EMF sensor, piezoresistive sensor, or piezoelectric sensor, for example. Of course, there may be more than one position sensor 32 and each position sensor may be a different type of sensor. The position sensor 32 may sense or output a pulse density modulated signal of the x-position of the haptic actuator 30 and may be used to close the closed-loop and/or track a desired trajectory of the field member 50, as will be appreciated by those skilled in the art.

A driver 33 drives the haptic actuator 40, and senses a drive voltage and drive current for the haptic actuator. The driver 33 may sense one or both of the drive voltage and drive current for the haptic actuator 40. In some embodiments, the driver 33 may drive the haptic actuator 40 at different frequencies, which, as will be described in further detail below, may be used to estimate the system and haptic actuator parameters. The driver 33 may include a class D amplifier 35 and a step-up converter 34 coupled thereto for signal processing between the haptic actuator 40 and a closed-loop controller 60. Additionally, position data, for example, X-axis position data, from the position sensor 32 may be processed by a position sensing component 36 of the driver 33.

The closed-loop controller 60 cooperates with the position sensor 32 and the driver 33 to determine a calibration of the haptic actuator 40 based upon the sensed position of the field member 50 and one of more of the driving voltage and driving current. The closed-loop controller 60 includes a processor 61 and a memory 62 coupled thereto. While a processor 61 and a memory 62 coupled thereto are described, it will be appreciated by those skilled in the art that there may be more than one processor and/or memory, and which may be shared. Also functions described as being performed by the closed-loop controller 60 should be understood as being performed by the processor 61. The memory 62 stores the calibration of the haptic actuator 30 and the reference pattern. The calibration may be determined based upon one or more of a resistance, inductance, capacitance, and a motor constant, for example. Of course, the calibration may be determined based upon other and/or additional factors.

The closed-loop controller 60, particularly, the processor 61, stores reference patterns of movement for the field member 50 in the memory 62. The reference patterns of movement are different, with each reference pattern of movement corresponding to a desired one of different operating modes of haptic feedback. More particularly, it may be desirable to operate the haptic actuator 30 in any of a vibe (longer duration feedback) mode, a tap (short duration) mode, a mini-tap mode, and a braking mode, for example, with each of the reference patterns having a different drive waveform associated therewith. The haptic actuator 40 may be operated in any number of modes based upon a desired type of haptic feedback.

The closed-loop controller processor 61 also drives the haptic actuator in a closed-loop configuration based upon the calibration of the haptic actuator and at least one reference pattern of movement of the field member. Where the driver 33 drives the haptic actuator at different frequencies, the closed-loop controller 60 determines the calibration based upon a sensed impedance of the haptic actuator at the plurality of different frequencies.

In some embodiments, the closed-loop controller processor 61 may determine the calibration of the haptic actuator over a given time period and stored in the memory 62. The closed-loop controller 60 may drive the haptic actuator 40 in the closed-loop configuration based upon the calibration of the haptic actuator over the given time period. In other words, the calibration of the haptic actuator 30 may be learned over the given time period.

The closed-loop controller 60 may receive as an input, a command, instruction, and/or trigger, which would trigger the closed-loop controller to generate the desired waveforms, or in other words, to drive the haptic actuator 40, based upon the calibration and in one of the modes described above (e.g., mini-tap or a desired arbitrary waveform that may be synthesized by an upstream system processor or controller 22). The closed-loop controller 60 may also optionally receive as an input, a desired trajectory input to "push" the closed-loop controller to follow the arbitrary synthesized waveform, for example.

Further details of the closed-loop controller 60 will now be described. The processor 61 of the closed-loop controller 60 may operate as a state observer, which can generate a state space model based upon the dynamic model of the haptic actuator 40 or system, for example, the motor constant and/or the motor capacitance, and using a system identification protocol or an adaptive observer as will be appreciated by those skilled in the art. The state observer may include or operate based upon a linear quadratic estimation, for example, a Kalman filter. In other words, the calibration may be determined based upon a linear quadratic estimation.

Since it may be particularly desirable to obtain the velocity of the mass 51, the closed-loop controller 60 may estimate the velocity based upon the measured voltage and current, and may ignore the mechanical model of the haptic actuator 40 or system. The velocity may be used by the closed-loop controller 60 to close the closed-loop and/or track a desired trajectory, as will be appreciated by those skilled in the art.

The actuator may be defined by:

$$\begin{cases} m\ddot{x} + c_M \dot{x} + k_M x = k_{motor} I \\ V = RI + L\dot{I} + k_{motor} \dot{x} \end{cases}$$

The state space model may be defined as:

$$\begin{cases} \frac{d}{dt}\begin{bmatrix} x \\ \dot{x} \\ I \end{bmatrix} = \begin{bmatrix} 0 & 1 & 0 \\ \frac{-k_M}{m} & \frac{-c_M}{m} & \frac{k_{motor}}{m} \\ 0 & \frac{-k_{motor}}{L} & \frac{-R}{L} \end{bmatrix}\begin{bmatrix} x \\ \dot{x} \\ I \end{bmatrix} + \begin{bmatrix} 0 \\ 0 \\ \frac{1}{L} \end{bmatrix}V \\ \begin{bmatrix} I \\ V \end{bmatrix} = \begin{bmatrix} 0 & 0 & 1 \\ 0 & 0 & 0 \end{bmatrix}\begin{bmatrix} x \\ \dot{x} \\ I \end{bmatrix} + \begin{bmatrix} 0 \\ 1 \end{bmatrix}V \end{cases}$$

$$\begin{cases} \dot{X} = A_c X + B_c u \\ Y = C_c X + D_c u \end{cases}$$

The state space in the discrete domain may be defined as:

$$\begin{cases} x[n+1] = A_d x[n] + B_d u[n] \\ y[n] = C_d x[n] + D_d u[n] \end{cases}$$

Taking the above continuous to the discrete transformation:

$$A_d = e^{A_c T_s}, B_d = A_c^{-1}(A_d - I)B_c, C_d = C_c, D_d = D_c$$

State Observer:

$$\begin{cases} \tilde{x}[n+1] = A_d \tilde{x}[n] + B_d u[n] + L_d(y[n] - \tilde{y}[n]) \\ \tilde{y}[n] = C_d \tilde{x}[n] + D_d u[n] \end{cases}$$

The state observer gain, $L_c$, is set by placing the poles of the observed system $(A_c - L_c C_c)$ at $\lambda_1, \lambda_2, \lambda_3$. Discrete domain observer gains may be estimated as: $L_d = (A_c^{-1}(A_d - I)L_c$.

The system identification of the haptic actuator 40 with respect to electrical impedance analysis will now be described. The dynamics of the haptic actuator 40 in the Laplace domain may be defined as:

$$\begin{cases} [ms^2 + c_M s + k_M]X(s) = k_{motor}I(s) \\ V(s) = [R + Ls]I(s) + k_{motor} s X(s) \end{cases}$$

The electrical impedance of the haptic actuator 30 may be described as:

$$Z(s) = \frac{V(s)}{I(s)} = \underbrace{R + Ls}_{Z_E} + \underbrace{\frac{k_{motor}^2 s}{ms^2 + c_M s + k_M}}_{Z_{EM}}$$

As described above, the parameters of the system can be estimated by exciting or driving the haptic actuator 40 at different frequencies and measuring the complex electrical impedance. This may be accomplished by using an I/Q mode or a fast Fourier transform (FFT), for example. For a relatively simple velocity based closed-loop controller 60, only resistance R may be estimated on DC current such that:

$$2/R = I(+V) - I(-V).$$

Figure 4A:
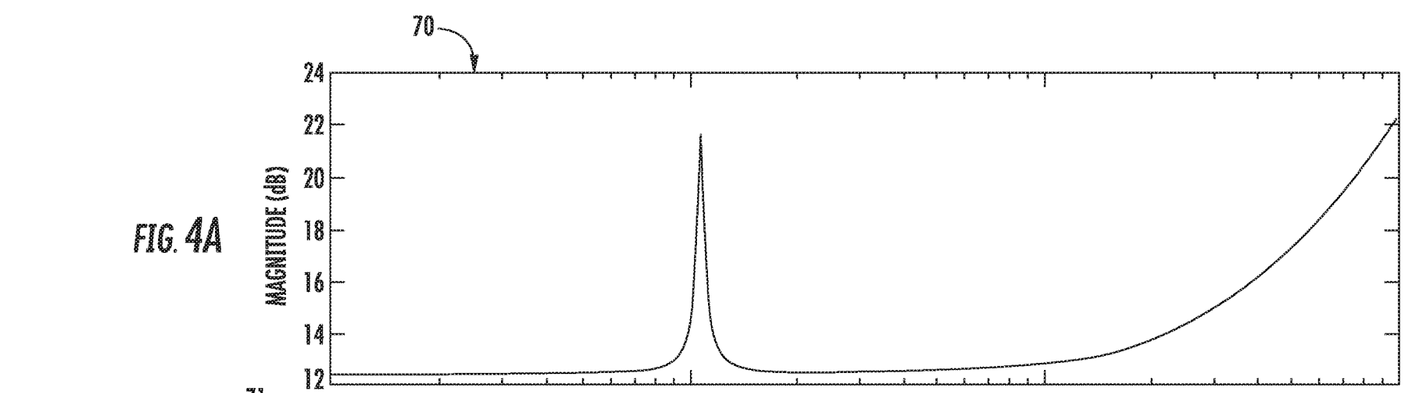
FIGS. 4a and 4b are bode diagrams of frequency versus magnitude and frequency versus phase, respectively for a haptic actuator in accordance with an embodiment.
Figure 4B:
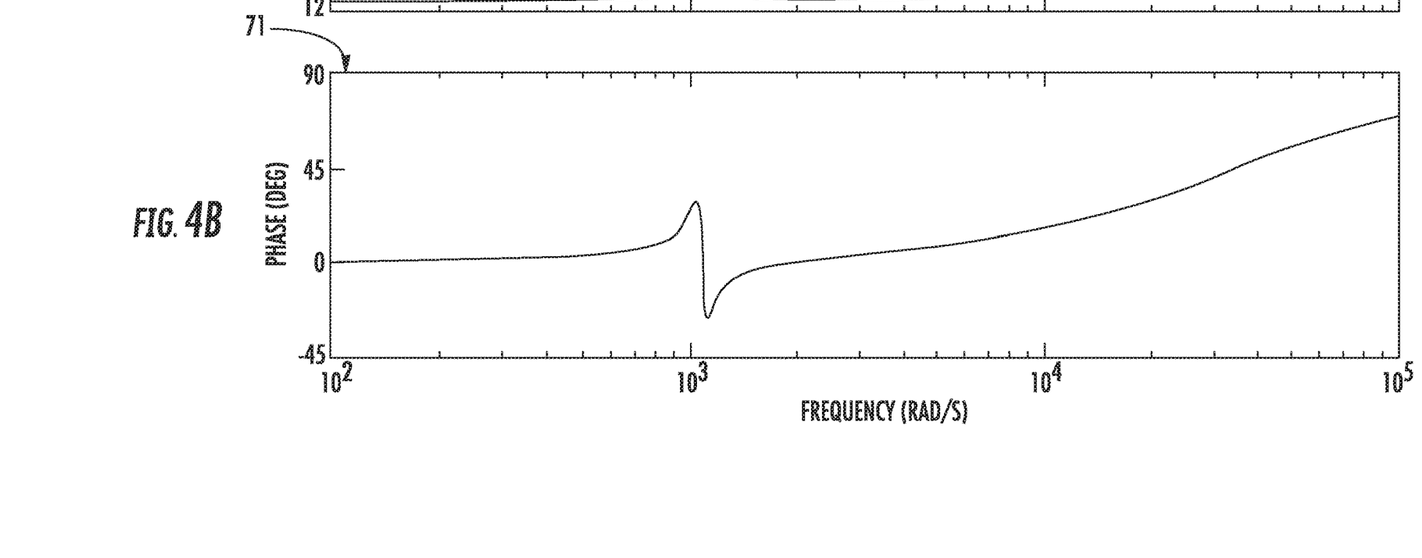
Figure 5A:
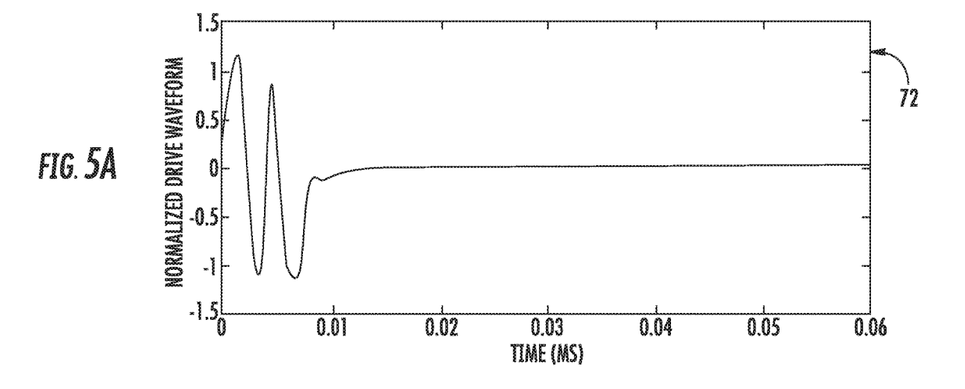
FIG. 5a is a graph of an exemplary 250 Hz mini-tap drive waveform generated for the haptic actuator of FIG. 3 in accordance with an embodiment.
Figure 5B:
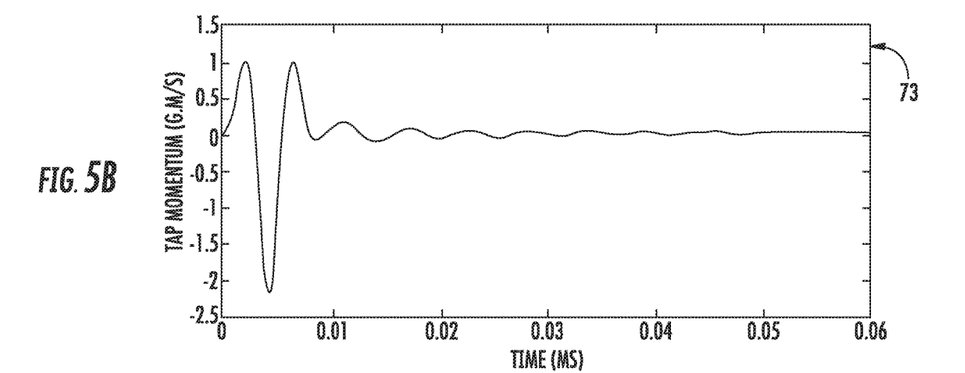

The graphs 70, 71 in FIGS. 4a and 4b are Bode diagrams of frequency versus magnitude and frequency versus phase, respectively, of an electrical impedance analysis of the haptic actuator 40.

Further details of the different reference patterns of movement, specifically each corresponding different operating modes of haptic feedback will now be described. In particular, one mode of haptic feedback referred to as "mini-tap drive control" may be described as:

$$\begin{cases} u[n] = V_{max} & 0 < n < \frac{f_0}{T_s(1.4 f_{Tap}^2 + 0.6 f_{Tap} f_0)} \\ u[n] = -V_{max} & \frac{0.5}{f_{Tap} T_s} < n < \frac{1}{f_{Tap} T_s} \end{cases}$$

Another mode referred to as "sinusoidal tap" (e.g. low frequency tap mini-tap) may be described as:

$$u[n] = V_{max} u[n] = V_{max} \sin(2\pi f_{Tap} T_s n) \quad 0 < n < \frac{0.75}{f_{Tap} T_s}$$

Other modes include:
"Resonance Vibe Drive":

$$\begin{cases} u[n] = V_{max}\text{sgn}(\tilde{\dot{x}}[n]) & \tilde{\dot{x}}[n]^2 + \omega_0^2 \tilde{x}[n]^2 < \dot{x}_{set\_vibe}^2 \\ u[n] = 0 & \tilde{\dot{x}}[n]^2 + \omega_0^2 \tilde{x}[n]^2 > \dot{x}_{set\_vibe}^2 \end{cases}$$

"Specific Frequency Vibe Drive":

$$\begin{cases} u[n] = V_{max}\text{sgn}(\sin(2\pi f_{vibe} T_s n)) & \tilde{\dot{x}}[n]^2 + \omega_{vibe}^2 \tilde{x}[n]^2 < \dot{x}_{set\_vibe}^2 \\ u[n] = 0 & \tilde{\dot{x}}[n]^2 + \omega_{vibe}^2 \tilde{x}[n]^2 > \dot{x}_{set\_vibe}^2 \end{cases}$$

"Tap Vibe Brake Control":

$$u_{PD}[n] = -a\tilde{\dot{x}}[n] + b\tilde{\dot{x}}[n-1]$$

$$\begin{cases} u[n] = u_{PD}[n] & |u_{PD}[n]| < V_{max} \\ u[n] = V_{max}\text{sgn}(u_{PD}[n]) & |u_{PD}[n]| > V_{max} \end{cases}$$

"Tap Drive Bang-Bang Control":

$$\begin{cases} u[n] = V_{max} & 0 < n < \dfrac{0.5}{f_{Tap}T_s} \\ u[n] = -V_{max} & \dfrac{0.5}{f_{Tap}T_s} < n < \dfrac{1}{f_{Tap}T_s} \end{cases}$$

"Vibe Drive Bang-Bang Control":

$$\begin{cases} u[n] = V_{max}\operatorname{sgn}(\dot{\tilde{x}}[n]) & |\tilde{x}[n]| < \dot{x}^2_{set\_vibe} \\ u[n] = 0 & |\tilde{x}[n]| > \dot{x}^2_{set\_vibe} \end{cases}$$

Of course, there may be other and/or additional modes as will be appreciated by those skilled in the art.

A smoothing drive signal, for example, a first order low pass filter, may be applied as follows:

$$u_F[n] = \alpha u[n] + (1-\alpha)u[n-1]$$

Referring now to FIGS. 5-8, exemplary graphs illustrate simulations of the different drive waveforms, momentum, voltage, and/or displacement for several modes. Referring particularly to the graph 72 in FIG. 5a, a normalized drive waveform for a "mini-tap" at 250 Hz is illustrated for the haptic actuator 40. The graph 73 in FIG. 5b illustrates the tap momentum for the "mini-tap" at 250 Hz.

Figure 6A:
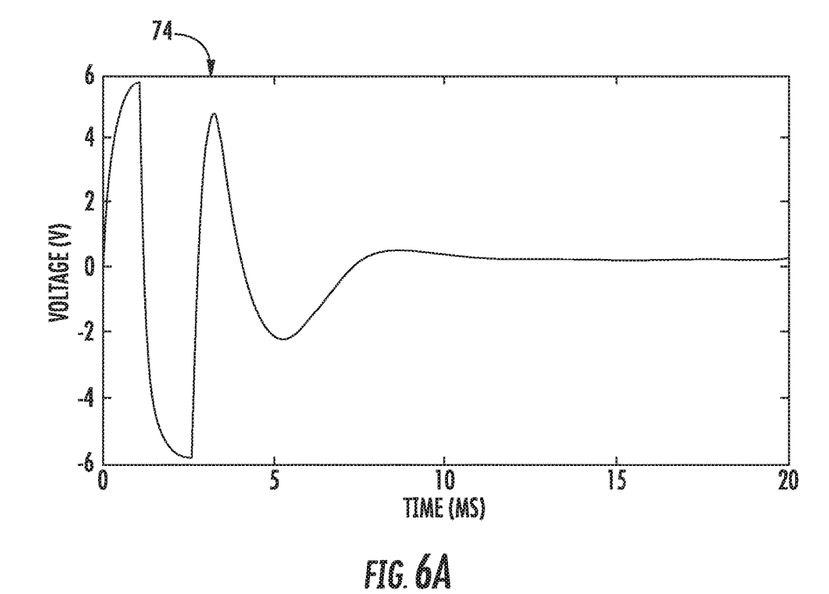
FIG. 6a is a graph of an exemplary square mini-tap drive waveform generated for the haptic actuator of FIG. 3 in accordance with an embodiment.
Figure 6B:
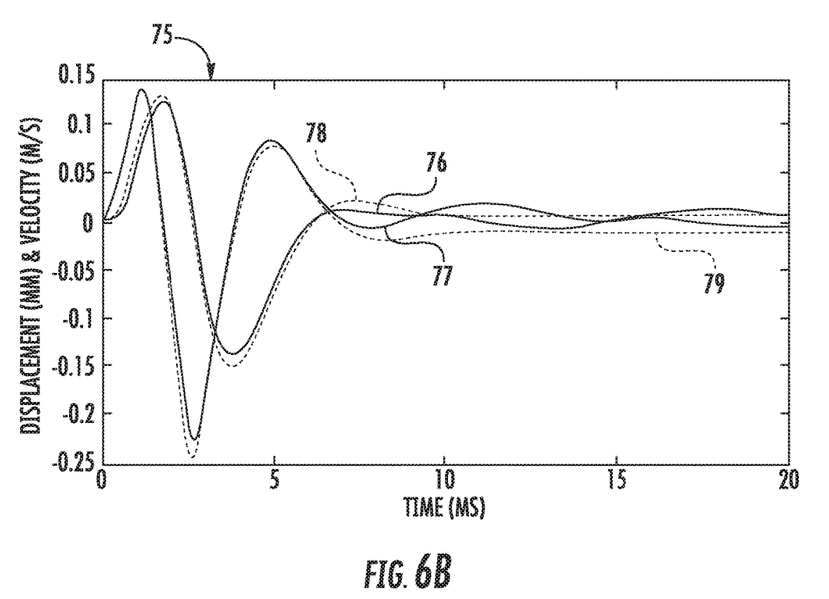

The graph 74 in FIG. 6a illustrates the drive waveform of a "square mini-tap" (at a frequency greater than 130 Hz) and the graph 75 in FIG. 6b illustrates the "square mini-tap" response, with the line 76 indicating expected displacement (in mm), the line 77 indicating expected velocity (in m/s), the line 78 indicating observed displacement (in mm), and the line 79 indicating observed velocity (in m/s).

Figure 7A:
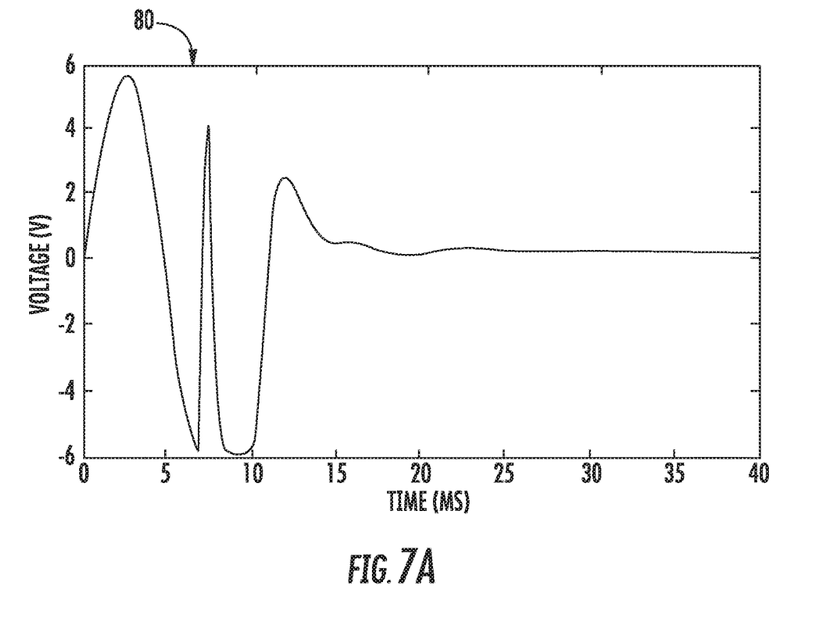
FIG. 7a is a graph of an exemplary sinusoidal mini-tap drive waveform generated for the haptic actuator of FIG. 3 in accordance with an embodiment.
Figure 7B:
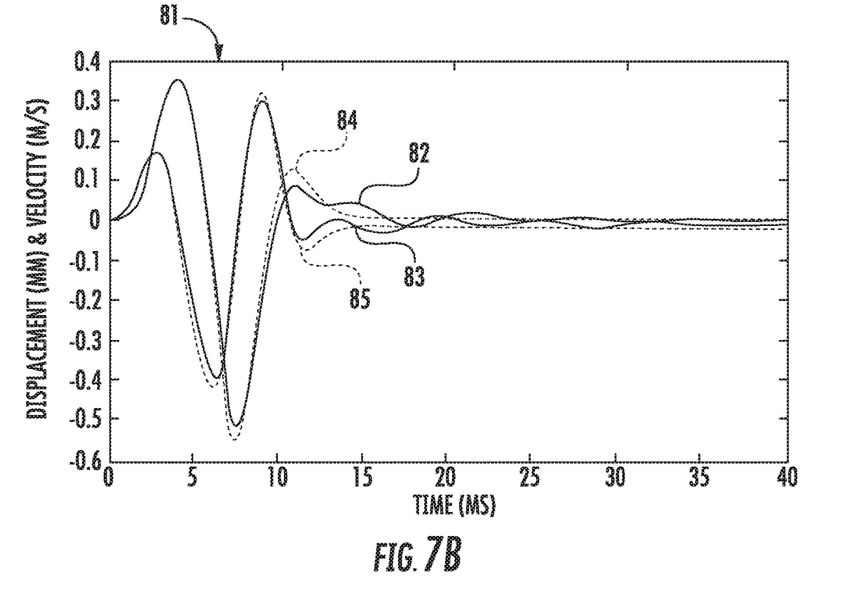

The graph 80 in FIG. 7a illustrates the drive waveform of a "sine mini-tap" (at a frequency less than 130 Hz) and the graph 81 in FIG. 7b illustrates the "sine mini-tap" response, with the line 82 indicating expected displacement (in mm), the line 83 indicating expected velocity (in m/s), the line 84 indicating observed displacement (in mm), and the line 85 indicating observed velocity (in m/s).

Figure 8A:
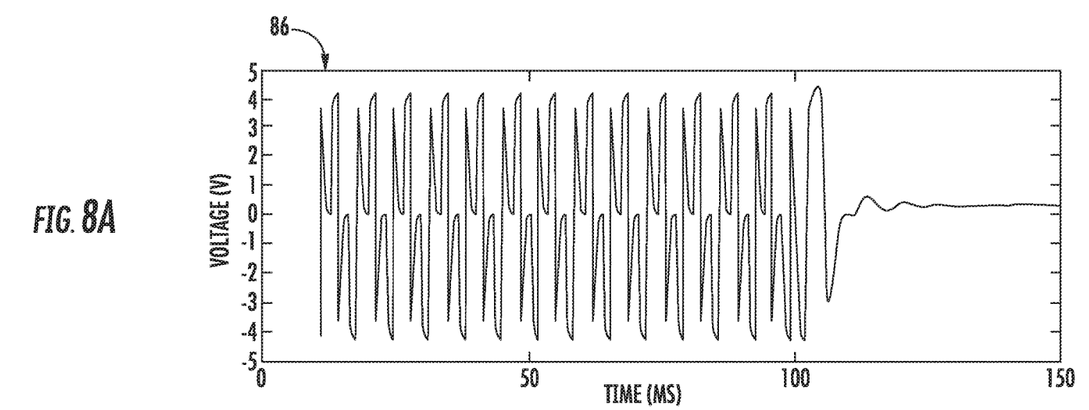
FIG. 8a is a graph of an exemplary resonance vibe drive waveform generated for the haptic actuator of FIG. 3 in accordance with an embodiment.
Figure 8B:
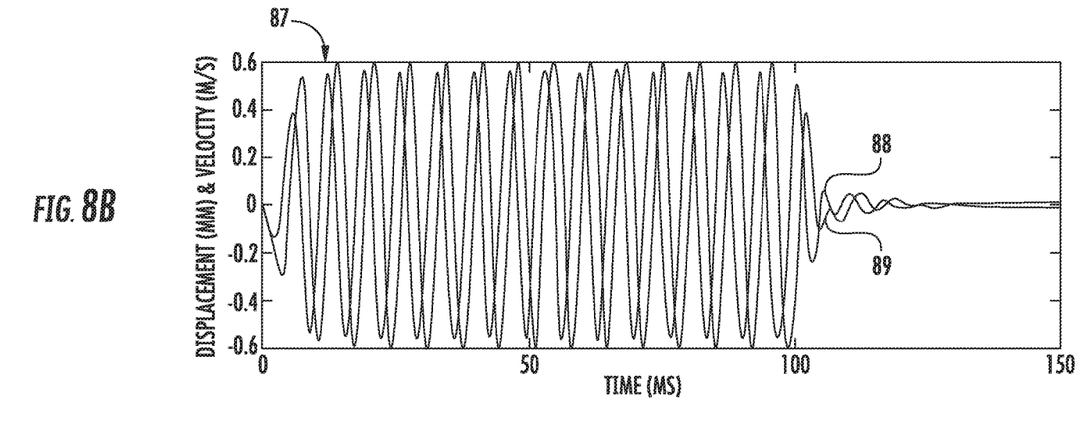

The graph 86 in FIG. 8a illustrates a "resonance vibe" drive waveform. The graph 87 in FIG. 8b illustrates the displacement 88 (in mm) and velocity 89 (in m/s) for the "resonance vibe" mode.

Figure 9:
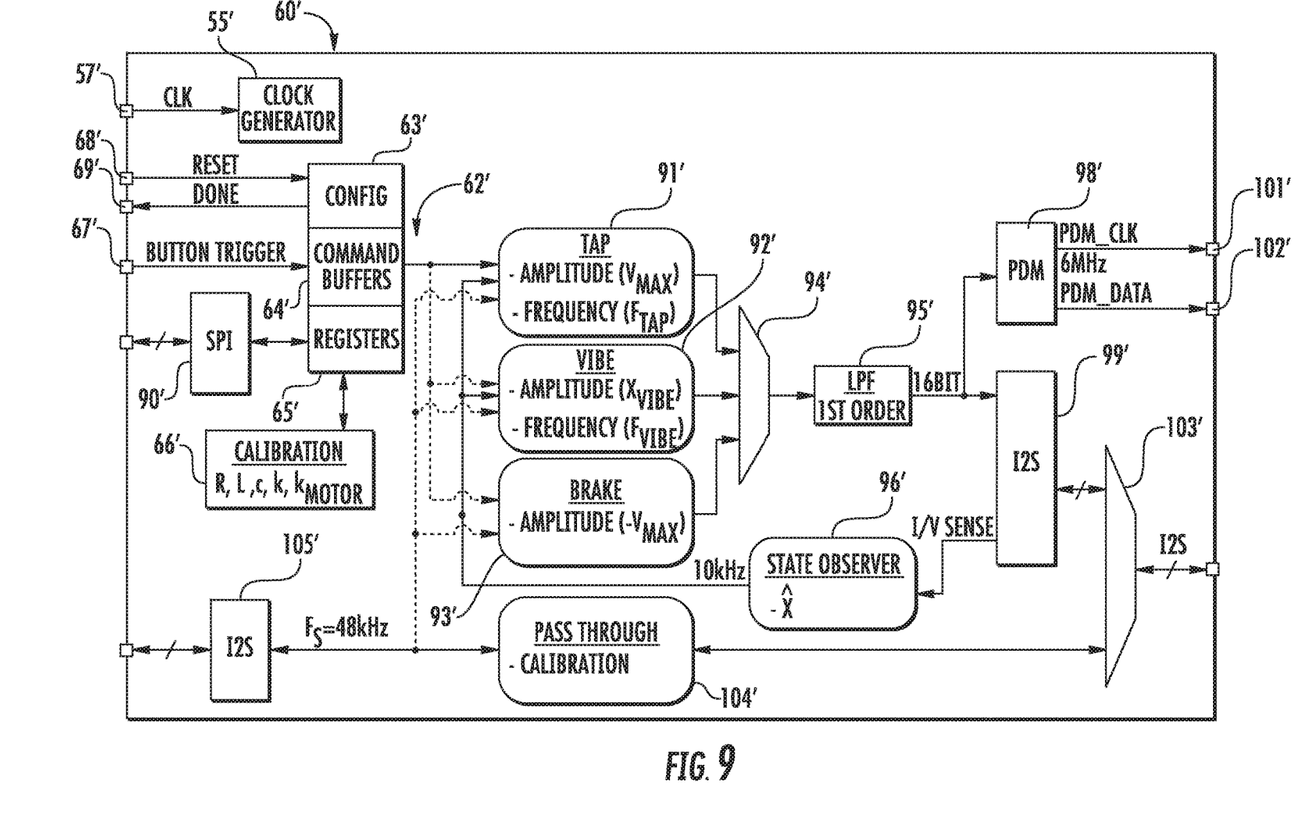
FIG. 9 is a schematic diagram of a closed-loop controller in accordance with another embodiment.

Referring now to the schematic diagram in FIG. 9, a more detailed schematic diagram of an exemplary embodiment of a closed-loop controller 60' implemented as a field programmable gate array (FPGA) is illustrated. A clock generator 55' having an input 57' is illustratively carried by a substrate 56'. The memory 62' is illustratively divided and includes configuration memory 63' for storing configuration parameters, command buffers 64' for storing commands, and registers 65' for storing sensed data and/or other data. The memory 62' also includes a calibration memory 66' for storing data related to the calibration, for example, resistance, inductance, capacitance, and a motor constant. A button trigger input 67' is coupled to the command buffers 64', and a reset input 68' and a status output 69', i.e., command done, are coupled to the configuration memory 63'. An serial peripheral interface (SPI) 90' is coupled to the registers 65'.

The command buffers 64' may output the different reference patterns of movement each corresponding to a desired one of a plurality of different operating modes of haptic feedback, e.g., tap 91', vibe 92', and brake 93'. The output of each of the tap 91', vibe 92', and brake 93' operating modes is coupled to a multiplexer 94', an output of which is coupled to a filter 95', for example, a first order low pass filter. Each of the tap 91', vibe 92', and brake 93' modes has an input which may receive a 10 kHz signal and is coupled to the state observer 96', which has been described above. As described above, the state observer 96' receives or cooperates to receive or sense the drive current and the drive voltage. In the present embodiment, the state observer receives the sensed drive current and drive voltage from an inter-IC Sound (I²S) interface 99'.

The output of the filter 95' is also coupled to the I²S interface 99' (e.g. a 16-bit output), and also coupled to a pulse density modulator (PDM) 98'. The PDM outputs a clock signal 101' at, for example, 6 MHz, and a data signal 102'. The I²S interface 99' is coupled to an input of a multiplexer 103'. Another input of the multiplexer 103' is coupled to a pass through 104' which includes the calibration. The pass through 104' is coupled to another I²S interface 105' and communicates therewith at 48 kHz, for example. The pass through 104' may optionally be coupled to each of the tap 91', vibe 92', and brake 93' modes.

A method aspect is directed to a method of operating a haptic actuator 40 that includes an actuator housing 41 and a field member movable 50 within the housing. The method includes sensing, using a position sensor 32, a position of the field member during movement thereof, driving, using a driver 33, the haptic actuator 40, and sensing, using the driver, at least one of a drive voltage and drive current for the haptic actuator. The method also includes using a closed-loop controller 60 cooperating with the position sensor 32 and driver 33 to determine a calibration of the haptic actuator based upon the sensed position of the field member and at least one of the driving voltage and driving current, store at least one reference pattern of movement for the field member, and drive the haptic actuator in a closed-loop configuration based upon the calibration of the haptic actuator and at least one reference pattern of movement of the field member.

Figure 10:
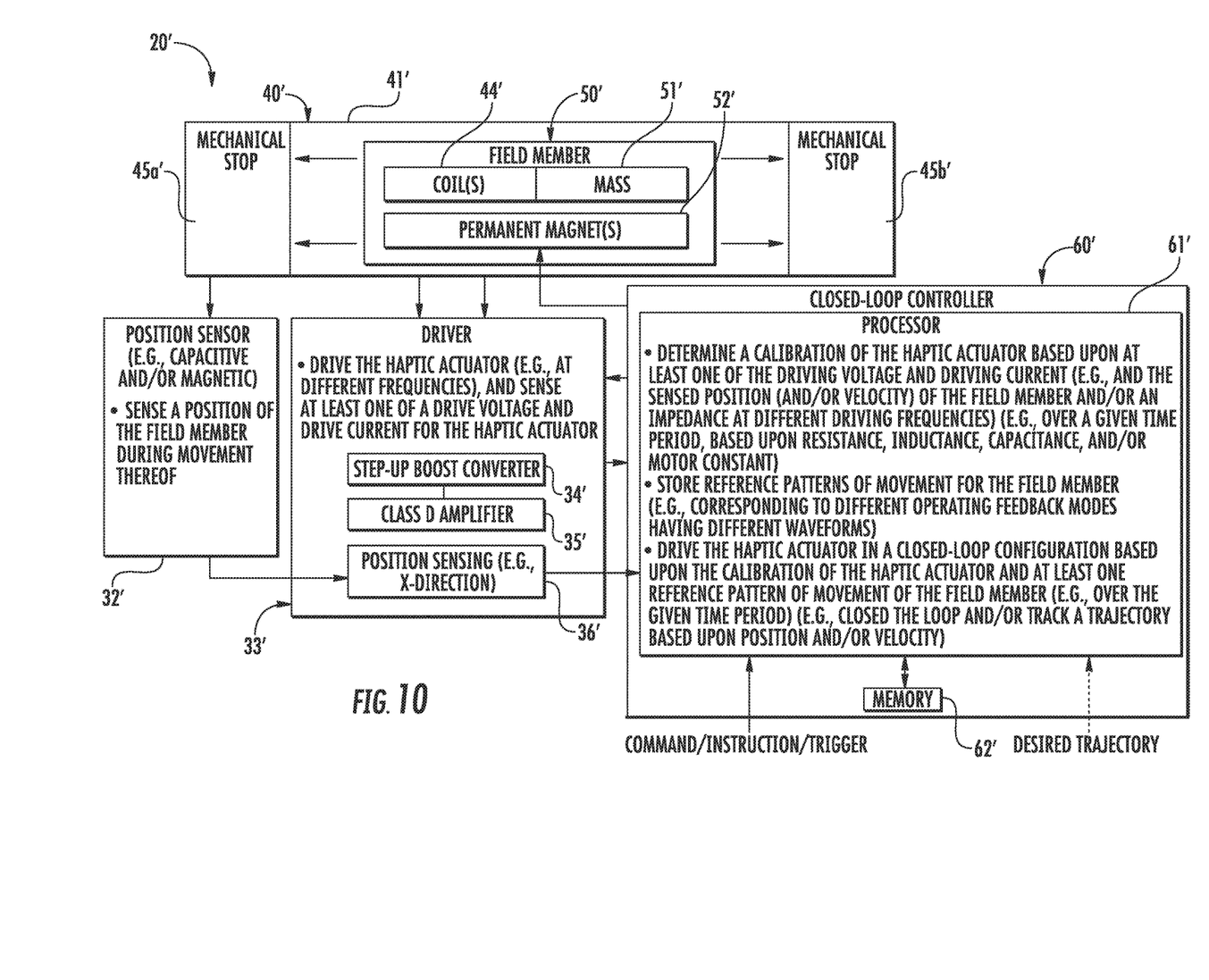
FIG. 10 is a schematic diagram of a haptic actuator according to another embodiment.

Referring now to FIG. 10, in another embodiment, the haptic actuator 40" may include a permanent magnet 52" carried by the actuator housing 41", and the field member 50" may include one or more coils 44" that cooperate with the permanent magnet. In other words, in contrast to the embodiment described above, the permanent magnet is stationary (i.e., carried by the actuator housing 41") and the coils 44", as part of the field member 50" are moving (i.e., connected to the mass). Of course, there may be any number of coils and/or permanent magnets.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a haptic actuator comprising a housing and a field member movable within the housing;
   a driver capable of driving the haptic actuator, and sensing at least one of a drive voltage and drive current for the haptic actuator; and
   a closed-loop controller cooperating with the driver, and capable of determining a calibration of the haptic actuator based upon at least one of the drive voltage and drive current, storing at least one reference pattern of movement for the field member, and driving the haptic actuator in a closed-loop configuration based upon the determined calibration of the haptic actuator and the stored at least one reference pattern of movement for the field member.

2. The electronic device of claim 1 further comprising a position sensor capable of sensing a position of the field member during movement thereof, and wherein the closed-loop controller is capable of determining the calibration based upon the sensed position of the field member.

3. The electronic device of claim 2 wherein the closed-loop controller is capable of closing the closed-loop configuration based upon the position sensor.

4. The electronic device of claim 2 wherein the closed-loop controller is capable of tracking a trajectory of the field member based upon the position sensor.

5. The electronic device of claim 2 wherein the position sensor comprises at least one of a capacitive sensor, an optical sensor, and a magnetic sensor.

6. The electronic device of claim 1 wherein the closed-loop controller is capable of determining the calibration of the haptic actuator based upon a velocity of the field member.

7. The electronic device of claim 6 wherein the closed-loop controller is capable of closing the closed-loop configuration based upon the velocity of the field member.

8. The electronic device of claim 6 wherein the closed-loop controller is capable of tracking a trajectory of the field member based upon the velocity of the field member.

9. The electronic device of claim 1 wherein the stored at least one reference pattern of movement comprises a plurality of different stored reference patterns of movement, each corresponding to a desired one of a plurality of correspondingly different operating modes of the haptic actuator.

10. The electronic device of claim 9 wherein each of the plurality of stored reference patterns has a different drive waveform associated therewith.

11. The electronic device of claim 1 wherein the closed-loop controller comprises a processor and a memory coupled thereto; and wherein the memory is capable of storing the calibration of the haptic actuator and the at least one stored reference pattern.

12. The electronic device of claim 1 wherein the driver is capable of driving the haptic actuator at a plurality of different frequencies; and wherein the closed-loop controller is capable of determining the calibration based upon a sensed impedance of the haptic actuator at the plurality of different frequencies.

13. The electronic device of claim 1 wherein the closed-loop controller is capable of:

determining the calibration of the haptic actuator over a given time period; and driving the haptic actuator in the closed-loop configuration based upon the determined calibration of the haptic actuator over the given time period.

14. The electronic device of claim 1 wherein the closed-loop controller is capable of determining the calibration of the haptic actuator based upon at least one of a resistance, inductance, capacitance, and a motor constant.

15. The electronic device of claim 1 wherein the haptic actuator comprises at least one coil carried by the housing; wherein the field member is movable within the housing responsive to the at least one coil; and wherein the closed-loop controller is capable of driving the haptic actuator by generating a drive waveform for the at least one coil.

16. The electronic device of claim 1 wherein the haptic actuator comprises at least one permanent magnet carried by the housing; wherein the field member comprises at least one coil cooperating with the at least one permanent magnet; and wherein the closed-loop controller is capable of driving the haptic actuator by generating a drive waveform for the at least one coil.

17. An electronic device comprising:

a housing;

wireless communications circuitry carried by the housing;

a haptic actuator carried by the housing and comprising an actuator housing and a field member movable within the actuator housing;

a driver capable of driving the haptic actuator, and sensing at least one of a drive voltage and drive current for the haptic actuator;

a closed-loop controller cooperating with the driver and capable of determining a calibration of the haptic actuator based upon at least one of the drive voltage and drive current, storing at least one reference pattern of movement for the field member, and driving the haptic actuator in a closed-loop configuration based upon the determined calibration of the haptic actuator and the stored at least one reference pattern of movement for the field member; and a device controller coupled to the wireless communications circuitry and the haptic actuator and capable of performing at least one wireless communications function and selectively operating the haptic actuator.

18. The electronic device of claim 17 further comprising a position sensor capable of sensing a position of the field member during movement thereof, and wherein the closed-loop controller is capable of determining the calibration based upon the sensed position of the field member.

19. The electronic device of claim 17 wherein the closed-loop controller is capable of determining the calibration of the haptic actuator based upon a velocity of the field member.

20. The electronic device of claim 17 wherein the stored at least one reference pattern of movement comprises a plurality of different stored reference patterns of movement, each corresponding to a desired one of a plurality of correspondingly different operating modes of the haptic actuator.

21. The electronic device of claim 20 wherein each of the plurality of stored reference patterns has a different drive waveform associated therewith.

22. The electronic device of claim 17 wherein the closed-loop controller comprises a processor and a memory coupled thereto; and wherein the memory is capable of storing the determined calibration of the haptic actuator and the stored at least one reference pattern.

23. The electronic device of claim 17 wherein the driver is capable of driving the haptic actuator at a plurality of different frequencies; and wherein the closed-loop controller is capable of determining the calibration based upon a sensed impedance of the haptic actuator at the plurality of different frequencies.

24. The electronic device of claim 17 wherein the closed-loop controller is capable of:

determining the calibration of the haptic actuator over a given time period; and driving the haptic actuator in the closed-loop configuration based upon the determined calibration of the haptic actuator over the given time period.

25. A method of operating a haptic actuator comprising a housing and a field member movable within the housing, the method comprising:
   driving, using a driver, the haptic actuator, and sensing, using the driver, at least one of a drive voltage and drive current for the haptic actuator; and
   using a closed-loop controller cooperating with the driver to
      determine a calibration of the haptic actuator based upon at least one of the drive voltage and drive current,
      store at least one reference pattern of movement for the field member, and
      drive the haptic actuator in a closed-loop configuration based upon the determined calibration of the haptic actuator and the stored at least one reference pattern of movement of the field member.

26. The method of claim 25 further comprising sensing, using a position sensor, a position of the field member during movement thereof, and wherein the closed-loop controller is used to determine the calibration based upon the sensed position of the field member.

27. The method of claim 25 wherein the closed-loop controller is used to determine the calibration of the haptic actuator based upon a velocity of the field member.

28. The method of claim 25 wherein the stored at least one reference pattern of movement comprises a plurality of different stored reference patterns of movement, each corresponding to a desired one of a plurality of correspondingly different operating modes of the haptic actuator.

29. The method of claim 28 wherein each of the plurality of stored reference patterns has a different drive waveform associated therewith.

30. The method of claim 25 wherein the haptic actuator is driven by the driver at a plurality of different frequencies; and wherein the closed-loop controller is used to determine the calibration based upon a sensed impedance of the haptic actuator at the plurality of different frequencies.

31. The method of claim 25 wherein the closed-loop controller is used to:
   determine the calibration of the haptic actuator over a given time period; and
   drive the haptic actuator in the closed-loop configuration based upon the determined calibration of the haptic actuator over the given time period.

32. The method of claim 25 wherein the closed-loop controller is used to determine the calibration of the haptic actuator based upon at least one of a resistance, inductance, capacitance, and a motor constant.

* * * * *